United States Patent [19]

Matsumura

[11] Patent Number: 5,060,163
[45] Date of Patent: Oct. 22, 1991

[54] PROGRAMMING APPARATUS FOR LATHES

[75] Inventor: Teruyuki Matsumura, Hachioji, Japan

[73] Assignee: Fanuc Ltd, Minamitsuru, Japan

[21] Appl. No.: 609,102

[22] Filed: Nov. 5, 1990

Related U.S. Application Data

[63] Continuation of Ser. No. 245,394 filed as PCT JP88/00124 on Feb. 9, 1988, published as WO88/06310 on Aug. 25, 1988, abandoned.

[30] Foreign Application Priority Data

Feb. 10, 1987 [JP] Japan .................. 62-029245

[51] Int. Cl.$^5$ .................. G06F 15/46; G05B 19/18
[52] U.S. Cl. ................. 364/474.22; 364/474.25; 364/474.26; 364/191
[58] Field of Search ................. 364/191–193, 364/474.22–474.27; 318/568.1

[56] References Cited

U.S. PATENT DOCUMENTS

| | | | |
|---|---|---|---|
| 4,008,461 | 2/1977 | Raven | 364/900 |
| 4,118,660 | 10/1978 | Ohtsuki et al. | 318/571 |
| 4,152,765 | 5/1979 | Weber | 364/474.27 X |
| 4,204,144 | 5/1980 | Hill | 318/568 |
| 4,445,182 | 4/1984 | Morita et al. | 364/474.25 |
| 4,490,781 | 12/1984 | Kishi et al. | 364/474.27 X |
| 4,521,860 | 6/1985 | Kanematsu et al. | 364/474.26 |
| 4,530,046 | 7/1985 | Munekata et al. | 364/474.27 X |

FOREIGN PATENT DOCUMENTS

| | | |
|---|---|---|
| 0041336 | 12/1981 | European Pat. Off. . |
| 0220325 | 5/1987 | European Pat. Off. . |
| 0275325 | 7/1988 | European Pat. Off. . |

*Primary Examiner*—Joseph Ruggiero
*Attorney, Agent, or Firm*—Staas & Halsey

[57] ABSTRACT

A lathe programming apparatus and method according to the invention are for preparing an NC program used in a computer-controlled NC lathe. In order to input machining position data indicative of a portion to be subjected to additional machining, the apparatus includes a memory circuit (6) for storing machining position data for each coordinate axis of a workpiece profile, and an arithmetic circuit (1) for computing machining position data indicative of the additionally machined portion.

3 Claims, 1 Drawing Sheet

PROGRAMMING APPARATUS FOR LATHES

This is a continuation of copending application Ser. No. 07/245,394, filed as PCT JP88/00124 on Feb. 9, 1988 published as WO88/06310 on Aug. 25, 1988, abandoned.

BACKGROUND OF THE INVENTION

1. Field of the Invention

This invention relates to a lathe programming apparatus which automatically produces a numerical control (NC) tape for machining a workpiece to a predetermined shape based on a conversational machining program by means of a computer-controlled NC lathe or the like.

2. Description or Related Art

In order to fabricate a workpiece having a complicated and intricate structure when subjecting the workpiece to machining using a cutting tool, drill, milling machine or the like, positional coordinates are decided by utilizing a keyboard and display, for example, to prepare machining data for numerical control (NC). A machine tool is numerically controlled by an NC tape prepared by an NC unit based on a machining tool, thereby subjecting the workpiece to desired machining.

In order to compute a tool path, a coordinate system conforming to the method in which dimensions are written on a design drawing is selected using a graphic display. Data such as the shape of the workpiece blank, the dimensions thereof and the position of a base line are entered. While observing the display on which the coordinate axes and blank shape appear, the operator presses shape symbol keys on a keyboard to input the machining shape and, as machining position data, the dimensions necessary for each portion of the shape.

In machining by lathe, there are instances where a machining process referred to as "C-axis machining" accompanies outer-diameter machining and inner-diameter machining. In C-axis machining, the usual practice is to change the tool in use at the end of outer-diameter machining and designate a machining position which intersects the preceding tool path. When machining position data for a portion to be subjected to such additional machining are input, these data are entered overlapping the data used in computing the tool path for the preceding machining. This is inconvenient in that the programming operation requires time. The inconvenience is not limited to C-axis machining. In particular, reading the required numerical value data from a design drawing which includes a plurality of portions for additional machining is a source of input errors when performed by a beginner. Accordingly, an improvement in the operability of the apparatus is desired.

SUMMARY OF THE INVENTION

The present invention has been devised to solve the foregoing problems and its object is to provide a lathe programming apparatus so adapted that the inputting of position data regarding an additionally set machining shape of a workpiece can be carried out with ease and a tool path can be decided in an efficient manner.

In accordance with the present invention, there is provided a lathe programming apparatus for inputting a workpiece machining profile and position data and computing a tool path, comprising memory means for storing machining position data for each coordinate axis of a workpiece profile, and arithmetic means for computing machining position data indicative of an additionally machined portion from the stored machining position data indicative of the workpiece profile and position data of a specific coordinate axis regarding an additionally input machining shape.

In accordance with the lathe programming apparatus of the present invention, with regard to the shape of a lathed workpiece, a machining location regarding a portion to be subjected to additional machining such as C-axis machining is computed, without inputting position data along a plurality of coordinate axes, from the already stored machining position data for each coordinate axis of the workpiece profile. The inputting of position data regarding an additionally set machining shape of the workpiece is carried out with ease, and a tool path can be decided in an efficient manner.

DESCRIPTION OF THE PREFERRED EMBODIMENT

An embodiment of the present invention will now be described in detail with reference to the drawings.

Figure 1:
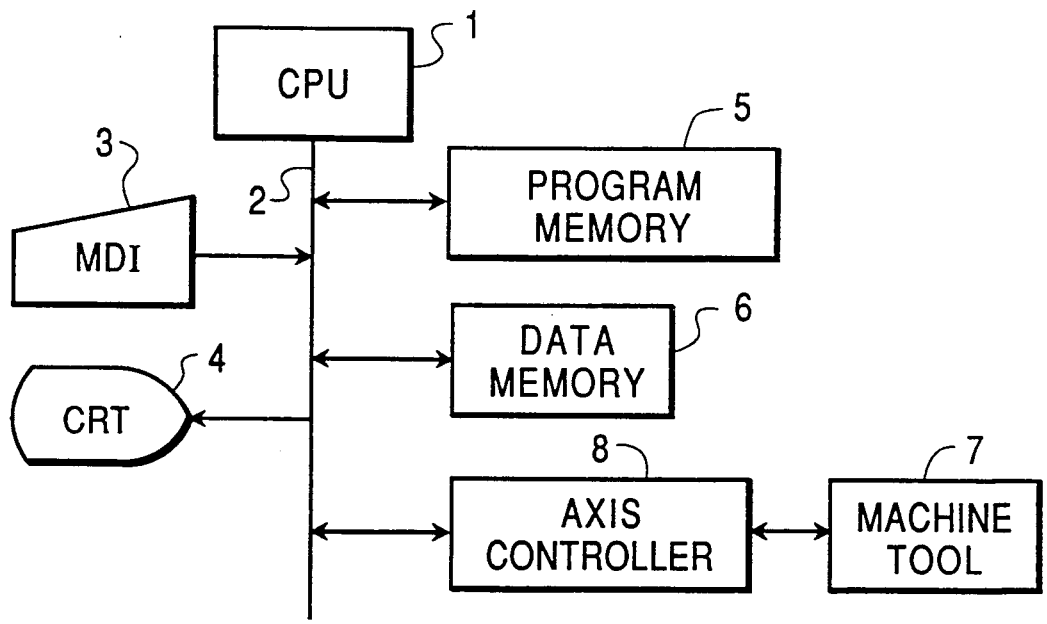
FIG. 1 is a block diagram in accordance with an embodiment of the present invention.

As shown in the block diagram of FIG. 1, a numerical control (NC) unit for processing a machining program using a microprocessor and for selecting, driving and controlling a predetermined tool such as a cutting tool includes a CPU 1, a data input unit 3 such as a keyboard, a display unit 4 such as a graphic display, a program memory 5, a data memory 6 for storing data, and a controller 8 for controlling the drive shaft of a machine tool 7. All of the units are connected to a bus 2 of the CPU 1.

Figure 2:
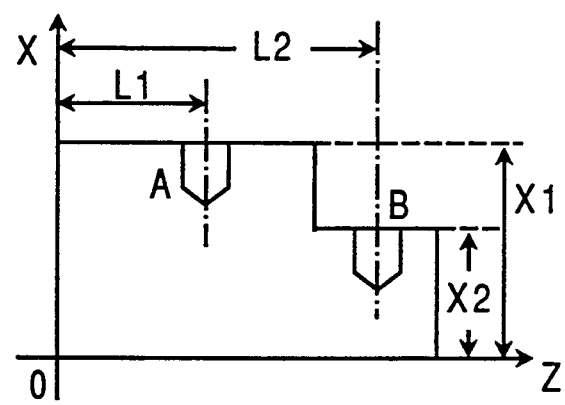
FIG. 2 is a graph illustrating an example of the machining shape of a workpiece.

FIG. 2 illustrates an example of a machining shape programmed in the NC unit. Here the workpiece is machined into a shape having a portion A of radius $x_1$ and a portion B of radius $x_2$ before C-axis machining is carried out. It is assumed that machining position data for machining the profile of the workpiece into a predetermined shape have already been stored in the data memory 6, etc. Accordingly, in drilling into the portions A and B that are to be additionally machined, machining data to be input in accordance with a prompt presented to the programmer based on a conversational machining program are merely position data $L_1$ and $L_2$ along the Z axis.

More specifically, in inputting the workpiece machining shape and position data and computing the tool path, the workpiece profile, which is machined first, is stored as position data along each coordinate axis. These data are called when deciding additional position data to be input. The data can be decided merely by inputting and designating the location of C-axis machining at portion A as $Z=L_1$ by calling $X=x_1$.

It should be noted that by setting beforehand an arithmetic program for deciding points at which workpiece profiles intersect, a tool path can be computed in a simple manner, without making inputs along all of the coordinate axes, in a case where a plurality of machining shapes intersect. No inconvenience in terms of deciding machining position is encountered when machining a side face of a workpiece and when machining a workpiece end face.

In the foregoing embodiment, programming in a three-axis lathe having a C axis is described. However, it goes without saying that the present invention is generally effective in a case where a plurality of machining shapes intersect and is not limited to the above-described embodiment.

Though an embodiment of the present invention has been described, the invention is not limited thereto but can be modified in various ways without departing from the scope of the claims.

The lathe programming apparatus of the present invention, which is for preparing an NC machining program for lathes, lightens the burden on the operator and enables data to be efficiently input with facility.

I claim:

1. A lathe programming apparatus for adding an additional machining program to a main machining program for machining a workpiece into a predetermined shape, comprising:

input means for inputting a main machining program composed of predetermined shape data and position data for machining the workpiece to the predetermined shape, and for inputting an additional machining program as a part program;

memory means for storing said main machining program and said additional machining program which are input by said input means; and designating means for designating a machining plane, contained in the predetermined shape data with respect to the workpiece which is to be additionally machined, from the main machining program which is stored in said memory means;

said input means inputting the position of an axis for additional machining on said machining plane which is designated by said designating means;

the arrangement being such that a new machining program is generated by adding, to the main machining program, an additional machining program in which a point where the input position of an axis of additional machining and the machining plane designated by said designating means intersect, and the intersecting point is used as a machining starting point in the additional machining program.

2. A lathe programming apparatus according to claim 1, further comprising display means for displaying a workpiece profile shape based on data of said main machining program and said additional machining program.

3. A lathe programming apparatus according to claim 1, wherein said axis of additional machining is a C-axis.

* * * * *